US008068522B2

(12) United States Patent
Barty

(10) Patent No.: US 8,068,522 B2
(45) Date of Patent: Nov. 29, 2011

(54) HYPER DISPERSION PULSE COMPRESSOR FOR CHIRPED PULSE AMPLIFICATION SYSTEMS

(75) Inventor: Christopher P. J. Barty, Hayward, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 763 days.

(21) Appl. No.: 11/166,988

(22) Filed: Jun. 23, 2005

(65) Prior Publication Data

US 2006/0050750 A1 Mar. 9, 2006

Related U.S. Application Data

(60) Provisional application No. 60/582,752, filed on Jun. 24, 2004.

(51) Int. Cl.
*H01S 3/10* (2006.01)
(52) U.S. Cl. ............. 372/25; 373/30; 373/102; 359/572
(58) Field of Classification Search ...................... 372/25
See application file for complete search history.

(56) References Cited

U.S. PATENT DOCUMENTS

| 5,235,606 | A | | 8/1993 | Mourou et al. | |
| 5,329,398 | A | * | 7/1994 | Lai et al. | 359/566 |
| 5,402,514 | A | * | 3/1995 | Booth et al. | 385/130 |
| 5,847,863 | A | * | 12/1998 | Galvanauskas et al. | 359/341.3 |
| 6,181,463 | B1 | | 1/2001 | Galvanauskas et al. | |
| 6,804,045 | B2 | * | 10/2004 | Barty | 359/337 |
| 2003/0156605 | A1 | * | 8/2003 | Richardson et al. | 372/25 |
| 2003/0165164 | A1 | * | 9/2003 | Delfyett et al. | 372/18 |
| 2004/0101237 | A1 | * | 5/2004 | Cao | 385/27 |

OTHER PUBLICATIONS

D. Strickland et al, "Compression of Amplified Chirped Optical Pulses", Optics Communications, vol. 56, No. 3, pp. 219-221 (1985). Elsevier Science Publishers B.V. (North Olland Physics Publishing Divison).
E. Treacy, "Optical Pulse Compression With Diffraction Gratings". IEEE J. Quan. Electronics, vol. QE-5, No. 9, Sep. 1969.
B.W. Shore et al, "Design of High-Efficiency Dielectric Reflection Gratings". Journal of the Optical Society of America. A-Optics & Image Science, vol. 14, No. 5, May 1997.
J. Limpert et al, "All Fiber Chirped-Pulse Amplification System Based on Compression in Air-Guiding Photonic Bandgap Fiber". Optics Express, vol. 11, No. 24. pp. 3332-3337. Dec. 1, 2003.

* cited by examiner

*Primary Examiner* — Jessica Stultz
*Assistant Examiner* — Xnning Niu

(57) ABSTRACT

A grating pulse compressor configuration is introduced for increasing the optical dispersion for a given footprint and to make practical the application for chirped pulse amplification (CPA) to quasi-narrow bandwidth materials, such as Nd:YAG. The grating configurations often use cascaded pairs of gratings to increase angular dispersion an order of magnitude or more. Increased angular dispersion allows for decreased grating separation and a smaller compressor footprint.

28 Claims, 4 Drawing Sheets

HYPER DISPERSION PULSE COMPRESSOR FOR CHIRPED PULSE AMPLIFICATION SYSTEMS

CROSS-REFERENCE TO RELATED APPLICATIONS

This application claims the benefit of U.S. Provisional Patent Application No. 60/582,752 filed Jun. 24, 2004 and titled "Hyper Dispersion Pulse Compressor For Chirped Pulse Amplification Systems" and is herein incorporated by reference in its entirety.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention provides ultra-intense laser pulses capable of interacting with matter, and more specifically, it relates to a chirped pulse amplification system and a method that includes lengthening a pulse's duration by often using cascaded pairs of gratings so as to increase the angular dispersion and produce a high power, short pulse.

2. Description of Related Art

The conventional method for circumventing optical damage due to amplification of high intensity pulsed sources is accomplished by chirped pulse amplification (i.e., CPA).

Chirped pulse amplification originated 60 years ago during the development of microwave radar. In the optical case, one avoids intensity-dependent damage by increasing the input temporal pulse duration prior to amplification by passing an input pulse through a frequency-dependent delay line. Such a dispersive delay line often includes prisms or gratings to separate the spectral content of the pulse and in doing so produce an optical path difference for different spectral components and thus stretch the pulses temporally prior to amplification and compress them afterwards. By amplifying a stretched pulse, higher peak intensity can be achieved without reaching the damage threshold of the amplifying material.

The required footprint of CPA pulse compressors and stretchers is approximately inversely proportional to the dispersion of the dispersive element and to the bandwidth of the pulse being stretched. For a given wavelength, however, the dispersion of a grating is a function of the groove density, which cannot be arbitrarily increased and still obtain a solution to the grating equation. Thus the dispersion of the gratings is limited, and the footprint is determined by the bandwidth of the pulses being stretched.

For CPA of pulses with transform-limited pulse widths in the picosecond regime, where the bandwidth of the pulse is low, grating compressors with grating separations of several meters are not uncommon, and prism compressors are impractical due to their even lower dispersion and greater length. Even with grating-based compressors, application of CPA to materials such as Nd:YAG and Nd:YLF, whose bandwidth limits compressed pulse durations to of order of about 5 ps or greater requires impractically large grating separations or extensive folding of the optical path.

Accordingly, a need exists for a configuration that can increase CPA compressor dispersion at high efficiency use angles so as to produce compact configurations. The present invention is directed to such a need.

SUMMARY OF THE INVENTION

Accordingly, the present invention provides a laser pulse compressor that utilizes at least one efficient diffraction grating configured to disperse and amplify the angular dispersion of introduced frequency chirped pulses and configured to remove the frequency chirp from said pulses so as to compress temporally said one or more pulses and provide for a smaller compressor footprint.

Another aspect of the present invention provides a system method of compressing pulses that includes: receiving from a source one or more temporally stretched optical pulses having a predetermined frequency chirp, angularly dispersing the frequency content of the pulses; amplifying the angular dispersion of the one or more pulses; providing a collimated and spatially dispersed pulse spectrum of the amplified angularly dispersed frequency content of the one or more pulses; and passing the collimated and spatially dispersed pulse spectrum back through the system via an optical reflector so as to remove the spatial dispersed pulse spectrum, further reduce a system footprint and produce on or more predetermined temporally compressed pulses.

Accordingly, the present apparatus and method provide for arrangements that reduce the footprint of pulse compressors used in chirped pulse amplification (CPA) systems. Such arrangements enable the practical application of CPA configurations to common high-gain but narrow-bandwidth media such as, but not limited to, Nd:YAG and Nd:YLF, and greatly simplify the generation of transform-limited, e.g., about 1 ps to about 10 ps high-energy pulses, for precision micromachining, x-ray generation, lidar, gamma-ray generation, etc.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

Figure 1:
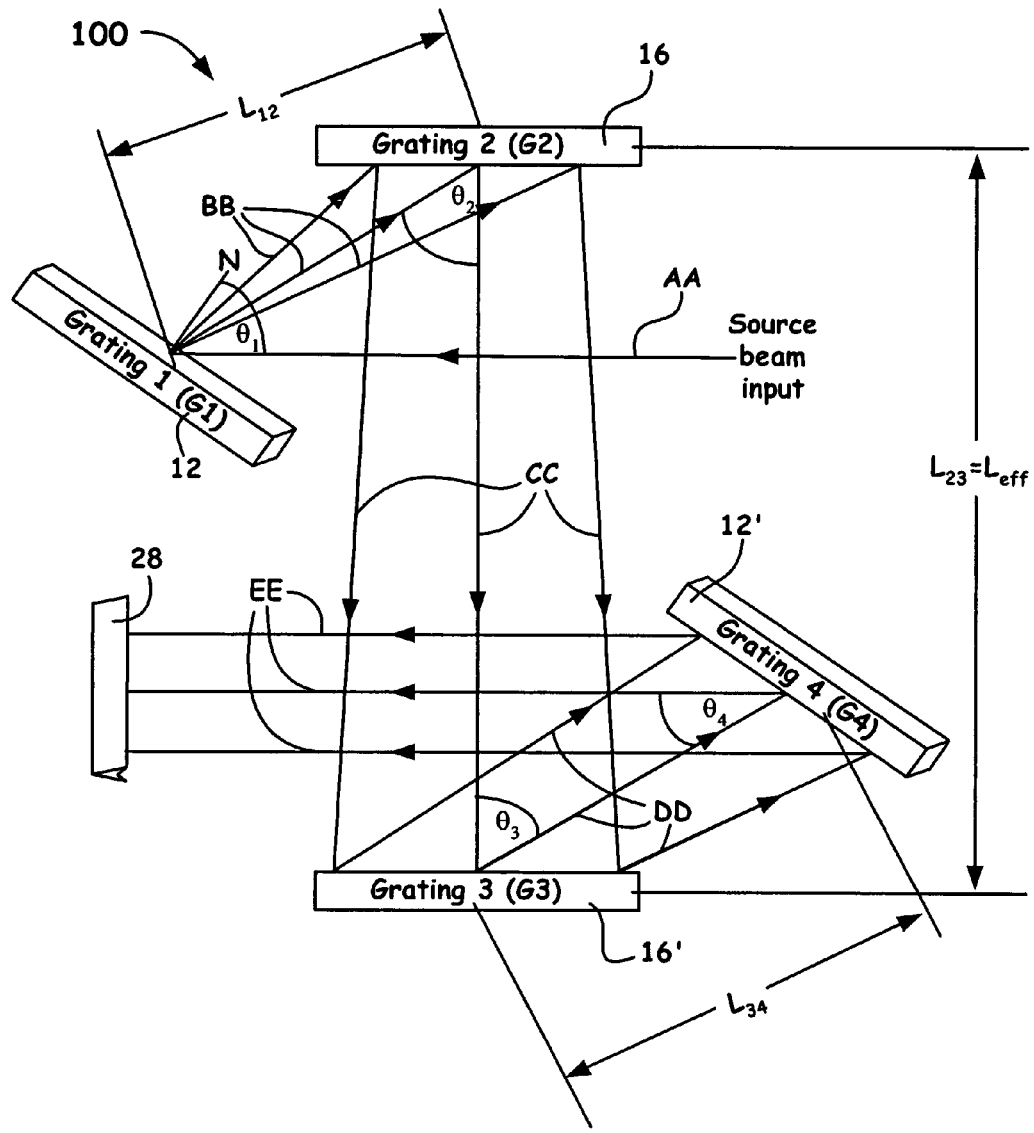
FIG. 1 illustrates a beneficial Hyper-dispersion pulse compressor.

Referring now to the following detailed information, and to incorporated materials; a detailed description of the invention, including specific embodiments, is presented.

Unless otherwise indicated, numbers expressing quantities of ingredients, constituents, reaction conditions and so forth used in the specification and claims are to be understood as being modified by the term "about." Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

General Description

Pulse compressors in a CPA system often include a pair of parallel diffraction gratings, such as, but not limited to, reflective gratings that can compress an amplified stretched pulse back to a desired temporal pulse-width prior to being directed to a predetermined application. The dispersion in such an arrangement can be predetermined by designing different frequency components of the laser pulse to travel physically different paths as determined by the angular dispersion of the diffraction grating, $m\lambda=\sin(\theta_{in})+\sin(\theta_{out})$, where $\lambda$ is the wavelength of the laser light and $\theta_{in}$, and $\theta_{out}$ are the input and output angles from the diffraction grating, respectively.

In particular, in an arrangement having a pair of gratings, the first grating angularly disperses the frequency content of the pulse and the second grating recollimates the frequency content (see for example: E. B. Treacy, "Optical Pulse Compression With Diffraction Gratings," IEEE J. Quan. Electron. QE-5(9), 454-458 (1969)). In such a configuration, the red frequencies are designed to have longer path lengths relative to blue wavelengths, thus producing what is known to one of ordinary skill in the art as negative dispersion. After the second grating, a pulse contains some spatial chirp, e.g., one side of the beam has red frequencies and the other side of the beam has blue frequencies. For a sufficiently large input beam diameter, in the middle of the beam, all frequencies are present. The size of the beam in the plane of diffraction is determined by the magnitude of the chirp that is being compensated and the input beam size. If a stretched pulse is about 1 ns in duration, then a compressor design requires an optical delay between red and blue frequencies of about 30 cm. Generally, the size of the beam on the second grating due to dispersion is of about this magnitude, which sets a practical upper bound on a stretched pulse duration to between about 1 ns and about 3 ns. Any larger duration and the grating size becomes prohibitive.

In principle, grating angular dispersion becomes infinite as the exit angle of the pulse from a grating approaches 90 degrees, thus the separation can be reduced by predetermining incidence angles into the compressor. It is to be appreciated, however, that the efficiency of diffraction gratings drops dramatically as the exit angle approaches 90 degrees so as to limit throughput.

The present invention described herein represents new compressor configurations for reducing the grating separations. Such configurations for 1 micron laser pulses can include gratings having between about 1000 grooves/mm and about 2000 grooves/mm with a designed high dispersion efficiency (e.g., a grating reflectivity of about 99.9%) to enable use angles of often between the Littrow angle and up to about 78 degrees, more often between about 72 degrees and 78 degrees, and even more often to enable a beneficially use angle of about 76.5 degrees.

Accordingly, the present invention provides compact grating arrangements that enable compression of pulses produced by systems incorporating amplification media, such as, but not limited to Yb: S-FAP, and in particular, narrow bandwidth systems (e.g. about 5 ps) that utilize rare-earth doped crystalline amplification media, such as, for example, Nd:YAG and Nd:YLF. Other gain media operating at wavelengths other than 1 micron, e.g. Ti:sapphire, can have similar arrangements but will utilize gratings of different groove density and angles of incidence.

In addition, although it is beneficial to utilize the grating configurations in the compressor stage of short pulse systems, it is to be realized that such configurations can also be configured as pulse stretchers where desired, so as to take advantage of the novel compact nature of the invention.

Finally, in the hyperdispersion compressor designs of the present invention, the third-order dispersion (TOD) can be a factor of about 3 larger than for two passes of a typical two-grating compressor. Such a factor makes balancing the TOD of standard stretcher designs more difficult. Even for the narrow bandwidth pulses that are beneficial in amplifying, the TOD must be managed to obtain a near transform-limited pulse for the large stretching ratios of our designs. Accordingly, a stretcher technology that can be beneficially arranged with the hyperdispersion compressor designs as disclosed herein can include, but are not limited to, "Martinez" type pulse stretchers where the single gratings are replaced by hyperdispersion grating pairs or stretchers made from chirped-fiber Bragg gratings for which one may simply write the desired dispersion into the fiber and pulse stretchers based on similar hyperdispersion grating arrangments.

Specific Description

A beneficial source employed in the present invention can be arranged as a repetition rate system (e.g., up to about a 100 MHz) that is capable of generating ultra-short pulses (i.e., an ultrashort pulse is one having a duration in the range of between about 5 femtoseconds to about 50 picoseconds) with single shot operation or low repetition rates selected from the aforementioned higher repetition rates by conventional active or passive optical means.

Such a laser source can be designed to provide a wavelength between about 200 nm and about 2000 nm, more often at about 1 μm, having an average power output of at least 10 mw and a bandwidth greater than about 2 nm. It is to be appreciated that any amplification media utilized as a laser source that is capable of producing pulses of the desired duration, wavelength, and bandwidth can be employed in use with the present invention. Exemplary laser materials can include, for example, Neodymium (Nd)-doped glass, Ti:Sapphire, and Yb:glass. Other beneficial host and laser materials can include KGW, KYW, YLF, S-FAP, YALO, YCOB, GdCOB, Cr:forsterite, and Ce:LiCAF. Although such materials are beneficial for use as a source of short pulses, the optimum desired materials include specific high gain, narrow band-width, rare-earth doped crystalline amplification media, such as, for example, Yb:YAG, Nd:YAG, and Nd:YLF because the disclosed arrangements reduce the footprint of the pulse compressors that utilize such common media and greatly simplify the generation of resultant transform-limited (between about 1 ps and about 10 ps) high-energy pulses.

Turning now to the drawings, FIG. 1 shows an exemplary generic configuration of the hyper-dispersion pulse compressor, generally designated as reference numeral 100, which utilizes a double pass through nested pairs of substantially parallel gratings. A first or outer grating pair, i.e., first grating (G1) 12 and fourth grating (G4) 12', can be arranged with a groove density and designed angular acceptance range dependent on the predetermined use wavelengths. However, for illustration purposes, when utilizing a wavelength of about 1 micron, such gratings can be configured with a groove density between about 1000 grooves/mm and about 2000 grooves/mm and capable of receiving input along beam paths AA and DD at incidence angles (incidence angles as defined from a grating normal N) between the Littrow angle and up to about 78 degrees. Similarly, an inner grating pair, i.e., second grating (G2) 16 and third grating (G3) 16', can also be arranged with a groove density and designed angular range dependent on the predetermined use wavelengths but for illustration purposes when utilizing a wavelength of about 1 micron, such gratings are often arranged with a groove density between about 1000 grooves/mm and about 2000 grooves/mm and are often arranged to receive input beams along beam paths BB and CC respectively at incidence angles of between the Littrow angle and up to about 78 degrees. While the example arrangement of FIG. 1 is often configured for pairs of gratings to have the same incidence angles and the same groove densities, it is to be appreciated that the arranged pairs of gratings need not have the same groove density or incidence angles so as to operate within the parameters of the present invention and that mixture of grating pairs and/or angles of incidence represents an added degree of freedom with respect to design and control of third order and higher phase distortion.

In the method of the invention, as illustrated in FIG. 1, a predetermined source beam (shown as a directional arrow) having a predetermined frequency modulation chirp produced by means known to one of ordinary skill in the art enters along beam path AA so as to be received by G1 12 and is redirected along beam path BB. Grating G2 16 of the configuration is arranged to receive the angularly dispersed beam produced by G1 12 and additionally arranged to amplify (i.e., increase the angular dispersion by a predetermined amount) and redirect the resultant beam along beam path CC. Grating G3 16' and grating G4 12' recollimate the spectral content received along beam paths CC and DD respectively and are designed to produce a collimated but spatially dispersed pulse spectrum along beam path EE similar to that in a typical Treacy parallel-grating compressor (see E. B. Treacy, "Optical Pulse Compression With Diffraction Gratings," IEEE J. Quan. Electron., vol. QE-5, pp. 454-8, 1969).

Stepping the beam up or down and passing the beam back through the system via an optical reflector, such as, for example, a roof mirror 28, removes the spatial chirp and reduces the overall separation of the gratings required by another factor of 2. Accordingly, a novel aspect of the present invention is the amplified angular dispersion produced by the first two grating elements (i.e., G1 12 and G2 16), so as to reduce the overall footprint (i.e., the effective grating separation $L_{eff}=L_{23}$) of hyper-dispersion pulse compressor 100 by greater than an order of magnitude less than a conventional two-pass, two-grating Treacy compressor having the same dispersion. The desired beam thus exits the hyper-dispersion pulse compressor system 100 from the right along reverse similar beam paths as discussed above with $L_{12}$ being the separation between G1 12 and G2 16, $L_{34}$ being the separation between G3 16' and G4 12' and $\theta_1$, $\theta_2$, $\theta_3$, and $\theta_4$ being the angles of incidence on gratings 12, 16, 16' and 12' respectively.

Figure 2:
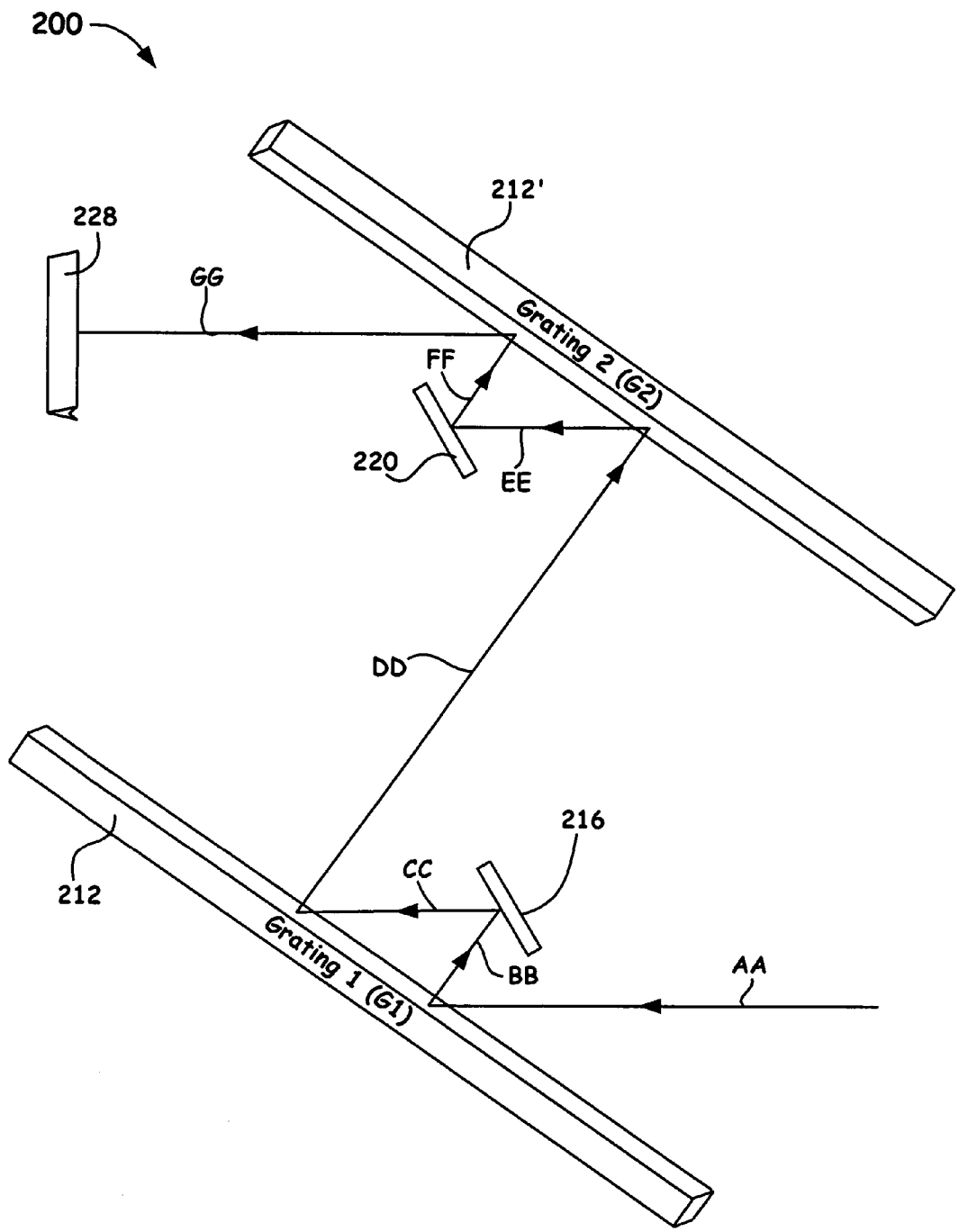
FIG. 2 shows another example arrangement of a Hyper-dispersion pulse compressor utilizing a pair of gratings.
Figure 3:
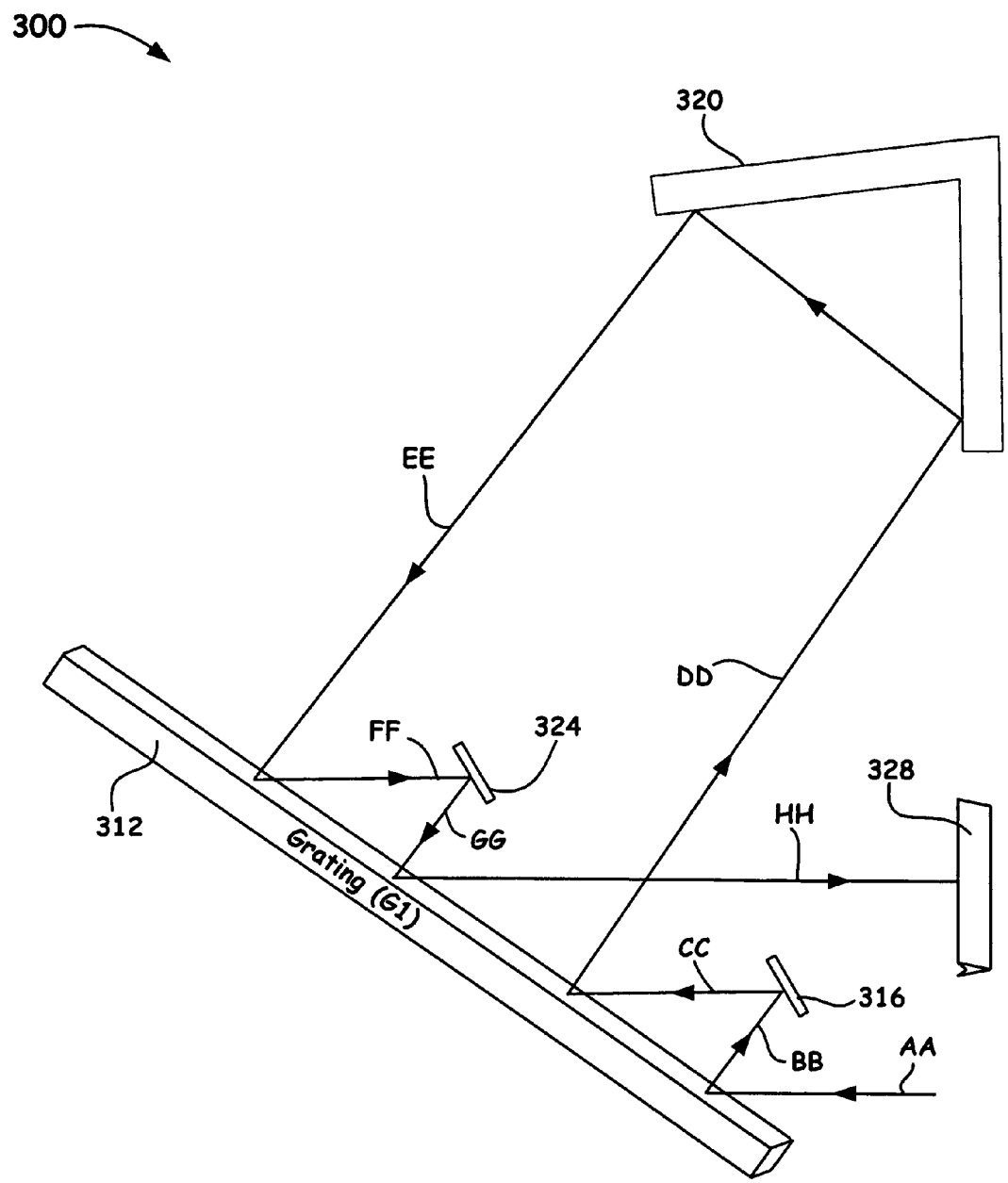
FIG. 3 shows another example arrangement of a Hyper-dispersion pulse compressor utilizing a single grating.

FIGS. 2 and 3 illustrate optional example hyper-dispersion pulse compressor arrangements, generally designated by reference numerals 200 and 300 respectively, which can reduce the number of gratings as shown by the configuration of FIG. 1. In a method of the invention, as shown in FIG. 2, a first grating 212 is arranged to receive a predetermined input beam along path AA and redirect an angularly dispersed beam along beam path BB. An optical element, such as, but not limited to, a first flat mirror 216, is arranged to receive the angularly dispersed beam along beam path BB and is further arranged to redirect such a beam along beam path CC so as to produce a second grating bounce on first grating 212. A second grating 212' is arranged to receive an amplified angularly dispersed beam along beam path DD as produced by the first flat mirror 216, and is further arranged to redirect rays received from first grating 212 towards a second flat mirror 220, which again redirects the rays along beam path FF to produce a second bounce off of second grating 212'. Second grating 212', which is parallel to first grating 212 and second flat mirror 220, which is parallel to first flat mirror 216, recollimate the spectral content received along beam path DD and are further arranged to produce a collimated but spatially dispersed pulse spectrum along beam path GG, again similar to that in a typical Treacy parallel-grating compressor as discussed above. The second flat mirror 220 second grating 212' combination is thus used to produce gratings 16' and 12', as shown in FIG. 1, which reduces the number of gratings by half.

The hyperdispersion compressor system 300, as shown in FIG. 3, illustrates a single grating 312 (e.g., an MLD efficient grating) arrangement that includes a pair of flat turning mirrors, e.g., 316, 324, configured to assist in directing rays along paths AA, BB, CC, DD, EE, FF, GG, and HH. In such an example arrangement, an optical redirecting device, such as a horizontal roof mirror 320, is used to receive rays directed along beam path DD (after the first single mirror bounce from mirror 316) and a vertical roof mirror 320 is configured after the third and fourth bounces (i.e., resultant rays FF and HH) from the grating. The amplified angularly dispersed rays, as discussed above, are contained along beam path DD, and the rays along beam path HH have a collimated but spatially dispersed pulse spectrum, similar to the arrangements as discussed above.

A further beneficial example arrangement can include one or more additional turning mirrors so as to increase the number of bounces off of the first grating. Such an arrangement increases dispersion but has a deleterious effect of decreasing throughput. However, recent advances in multi-layer dielectric (MLD) grating designs (see for example, "Design of high-efficiency dielectric reflection gratings," by B. W. Shore, M. D. Perry, J. A. Britten, R. D. Boyd, M. D. Feit, H. T. Nguyen, R. Chow, G. E. Loomis, and L. Lifeng, Journal of the Optical Society of America A-Optics & Image Science 14(5), 1124-1136 (1997), which is herein incorporated by reference in its entirety), having large regions of efficiencies in excess of 99%, can minimize such deleterious losses from the gratings and, for example, can make the overall throughput efficiency of hyperdispersion compressor designs greater than about 92% for four grating configurations, such as the example arrangement as shown in FIG. 1. Therefore, such use of MLD gratings make the overall efficiency of hyperdispersion compressor designs exceed most existing systems, which use gold gratings, and thus makes the hyperdispersion compressor as disclosed herein more than feasible.

Hyperdispersion Compressor Example

As an example of the benefits of the present invention, consider a compressor designed to compress a pulse centered at 1053 nm with a 0.2-nm FWHM Gaussian bandwidth that has been stretched to 589 ps Full Width half Maximum (FWHM) by a group-delay dispersion (GDD) of $1.73 \times 10^9$ fs$^2$/rad. Using a double-passed two-grating compressor (see E. B. Treacy, "Optical Pulse Compression With Diffraction Gratings," IEEE J. Quan. Electron., vol. QE-5, pp. 454-8, 1969) with a 63° incidence angle on 1760 line/mm gratings, the slant separation that is required to recompress the pulse is 10 m. Since the slant distance of the compressor sets the major dimension of the footprint of the device, such a compressor requires a multiple-folded path to fit on most optics tables.

For a hyperdispersion compressor of the present invention, using the same grating angles and groove densities, optical ray-tracing shows that the same GDD may be obtained using grating separations, as defined in FIG. 1, of $L_{23}$=1.32 m, $L_{12}$=200 mm and $L_{34}$=400 mm, which allows a footprint with a major dimension of about 7.6 times smaller than the Treacy compressor's major dimension without folding. It is to be appreciated that since the size of the beams on the final gratings in both compressors is a function of the required dispersion, the size of the final grating that is required in the hyperdispersion compressor is essentially the same as for a standard two-grating compressor.

Hyperdispersion Compressor Characteristics

The present invention retains several characteristics of the Treacy-style compressor. First, the group-delay dispersion (GDD) and higher-order dispersions are linear with the separation of the gratings, which makes adjusting the dispersion of the system a simple matter of adjusting the separation of the gratings. Second, the ratio of the GDD and third-order dispersion (TOD) is independent of the separation of the gratings but dependent on the incidence angle of the beam on the gratings and the groove densities of the grating pairs. Thus, in typical operation, the incidence angle may be chosen to give the proper ratio of GDD to TOD to match the stretcher and material independent of the grating separation that is used to zero the system GDD.

Figure 4A:
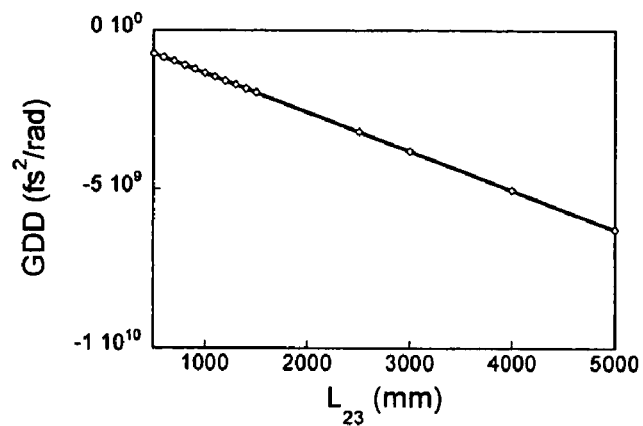
FIG. 4(a) shows group-delay dispersion (GDD) versus $L_{23}$ gratings separations.
Figure 4B:
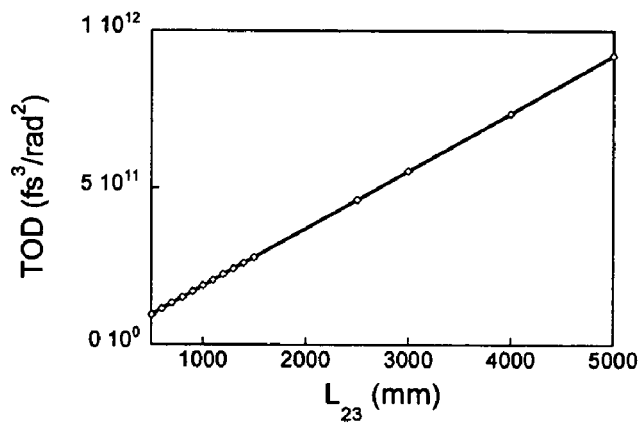
FIG. 4(b) shows third-order dispersion (TOD) versus $L_{23}$ gratings separations.
Figure 4C:
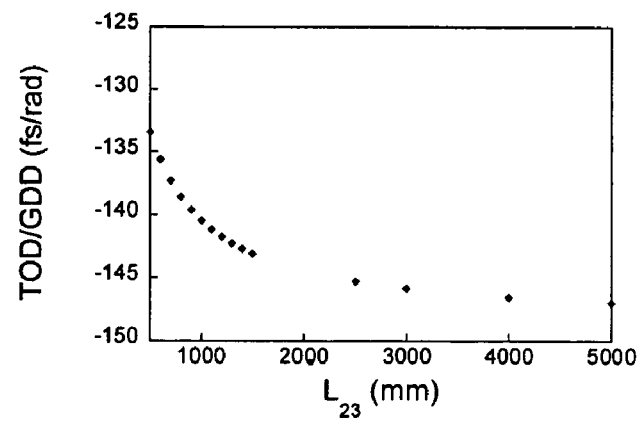
FIG. 4(c) shows the ratio of the TOD to the GDD.

FIGS. 4(a)-4(c) show the dependence of the dispersion on the separation of $L_{23}$, as shown in FIG. 1, using calculated ray tracing data. FIG. 4(a), which shows GDD versus $L_{23}$ separations and FIG. 4(b), which shows TOD versus $L_{23}$ separations illustrate that the GDD and TOD vary nearly linearly with $L_{23}$, such that the ratio of the TOD to the GDD, as shown in FIG. 4(c), varies less than about 20% for $L_{23}$ separations from about 500 mm to about 5000 mm. Similar calculations also show the dependences of the dispersion on the separations $L_{12}$ and $L_{34}$ are also nearly linear. Since the variation of the dispersion is highest for changes in $L_{23}$, the part of the optical path where the angular dispersion is highest, the present invention is often arranged with minimum separations for $L_{12}$ and $L_{34}$ and designed so as to not clip the beam. For systems with identical grating pairs, G1 and G2, as shown in FIG. 1, can be moved simultaneously to adjust $L_{23}$ and hence alter the dispersion without altering any of the other parameters. Also, since the dispersion still depends on the incidence angle, the incidence angle may still be used to tune the TOD. Thus, the parameters of the hyperdispersion compressor can be used to control the dispersion of the system in the same manner that the parameters of standard two-grating compressors are currently used.

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The invention claimed is:

1. A laser pulse compressor, comprising: a source of one or more pulses having a predetermined frequency chirp; and at least one diffraction grating configured in an optically cascaded arrangement comprising in order a first surface portion, a second surface portion, a third surface portion and a fourth surface portion, wherein said first surface portion disperse, said second surface portion amplifies, said third surface portion reduces and said fourth surface portion collimates the angular dispersion of the frequency content of said one or more pulses and wherein said pulse compressor further comprises means to reverse the path of said one or more pulses to remove said predetermined frequency chirp so as to further reduce a system footprint and temporally compress said one or more pulses.

2. The compressor of claim 1, wherein said at least one diffraction grating comprises regions of efficiencies greater than about 99%.

3. The compressor of claim 2, wherein said at least one diffraction grating comprises a multilayer efficient diffraction grating configured with a groove density between about 1000 grooves/mm and about 2000 grooves/mm.

4. The compressor of claim 3, wherein said at least one multilayer efficient diffraction grating is configured to receive said one or more pulses at an incidence angle between the Littrow angle and up to about 78 degrees.

5. The compressor of claim 4, wherein said at least one multilayer efficient diffraction grating comprises at least one parallel pair of multilayer efficient diffraction gratings.

6. The compressor of claim 5, wherein each grating of said parallel pair of multilayer efficient diffraction gratings comprises about the same groove density and is arranged to receive input at substantially a same incidence angle.

7. The compressor of claim 1, wherein said source comprises at least one lasing material selected from Nd:YAG, Yb:YAG, Nd:YLF, Neodymium (Nd)-doped glass, Yb:YAG, Ti:Sapphire, Yb:glass, KGW, KYW, YLF, S-FAP, YALO, YCOB, Cr:forsterite, and GdCOB.

8. The compressor of claim 7, said compressor arranged so as to produce transform-limited high-energy pulses between about 1 ps and about 10 ps using said at least one lasing material as a source.

9. The compressor of claim 1, said compressor further comprising at least one reflector.

10. The compressor of claim 9, wherein said reflector comprises at least one retroreflector selected from a horizontal and a vertical roof mirror.

11. The compressor of claim 1, wherein a footprint of said compressor can be arranged between about 500 mm and about 5000 mm.

12. The compressor of claim 1, wherein said source of one or more pulses having a predetermined frequency modulation chirp comprise a chirped-fiber Bragg grating stretcher.

13. A method of compressing an optical pulse, comprising: providing a laser pulse compressor, comprising a source of one or more pulses having a predetermined frequency chirp, wherein said laser pulse compressor further comprises at least one-diffraction grating configured in an optically cascaded arrangement comprising in order a first surface portion, a second surface portion, a third surface portion and a fourth surface portion, wherein said first surface portion disperse, said second surface portion amplifies, said third surface portion reduces and said fourth surface portion collimates the angular dispersion of the frequency content of said one or more pulses and wherein said pulse compressor comprises means for reversing the path of said one or more pulses to remove said predetermined frequency chirp so as to further reduce a system footprint and temporally compress said one or more pulses; receiving, at said first surface portion, said one or more pulses having said predetermined frequency chirp; angularly dispersing, from said first surface portion, the frequency content of said one or more pulses; amplifying, from said second surface portion, said angular dispersion of said one or more pulses; reducing with said third surface portion, said angular dispersion; collimating, with said fourth surface portion, said angular dispersion to produce a collimated and spatially dispersed pulse spectrum of said amplified angularly dispersion one or more pulses; and reversing the direction of said collimated and spatially dispersed pulse spectrum back through said system to temporally compress said one or more pulses.

14. The method of claim 13, wherein said at least one-diffraction grating comprises at least one multilayer efficient diffraction grating having regions of efficiencies greater than about 99%.

15. The method of claim 14, wherein said at least one multilayer efficient diffraction grating comprises a groove density between about 1000 grooves/mm and about 2000 grooves/mm.

16. The method of claim 15, wherein said at least one multilayer efficient diffraction grating is configured to receive said one or more pulses at an incidence angle between the Littrow angle and up to about 78 degrees.

17. The method of claim 16, wherein said at least one multilayer efficient diffraction grating comprises at least one parallel pair of multilayer efficient diffraction gratings.

18. The method of claim 17, wherein said parallel pair of multilayer efficient diffraction gratings comprises about a same groove density and is arranged to receive input at substantially a same incidence angle.

19. The method of claim 13, wherein said source comprises at least one lasing material selected from Nd:YAG, Yb:YAG, Nd:YLF, Neodymium (Nd)-doped glass, Yb:YAG, Ti:Sapphire, Yb:glass, KGW, KYW, YLF, S-FAP, YALO, YCOB, Cr:forsterite, and GdCOB.

20. The method of claim 19, further comprising the step of producing transform-limited high-energy pulses between about 1 ps and about 10 ps using said at least one lasing material as said source.

21. The method of claim 13, wherein said reflector comprises at least one retroreflector selected from a horizontal and a vertical roof mirror.

22. The method of claim 13, wherein passing said collimated and spatially dispersed pulse spectrum back through said system further reduces said system footprint by a factor of two.

23. The method of claim 22, wherein said system footprint can be arranged between about 500 mm and about 5000 mm.

24. The method of claim 13, further comprising the step of providing one or more temporally stretched optical pulses having a predetermined frequency modulation chirp using a chirped-fiber Bragg grating stretcher.

25. The compressor of claim 1, wherein said surface portion 1 is parallel with said surface portion 4 and wherein said surface portion 2 is parallel with said surface portion 3.

26. The method of claim 13, wherein said surface portion 1 is parallel with said surface portion 4 and wherein said surface portion 2 is parallel with said surface portion 3.

27. A laser pulse compressor, comprising:
a consecutive series of surface segments of at least one diffraction grating, wherein said segments are fixed along an optical axis, wherein said series comprises a first grating surface segment followed by a second grating surface segment followed by a third grating surface segment followed by a fourth grating surface segment, wherein said first grating surface segment is parallel with said fourth grating surface segment and wherein said second grating surface segment is parallel with said third grating surface segment; and a reflector positioned on said optical axis after said fourth, grating surface segment;
wherein the frequency content of a chirped pulse traveling on said optical axis will be dispersed by said first grating surface segment to produce a frequency dispersed pulse, wherein the frequency content of said frequency dispersed pulse will be amplified by said second grating surface segment to produce an amplified frequency dispersed pulse, wherein the amplified dispersal of the frequency content of said amplified frequency dispersed pulse will be reduced by said third grating segment to produce a reduced frequency dispersed pulse, wherein said reduced frequency dispersed pulse will be collimated by said fourth grating surface segment to produce a collimated frequency dispersed pulse and wherein said collimated frequency dispersed pulse will be reflected back on said optical axis to produce a compressed frequency content pulse upon reflection from said first grating surface segment.

28. A method of compressing a laser pulse, comprising:
directing a chirped pulse along an optical axis of a consecutive series of surface segments of at least one diffraction grating, wherein said segments are fixed along said optical axis, wherein said series comprises a first grating surface segment followed by a second grating surface segment followed by a third grating surface segment followed by a fourth grating surface segment, wherein said first grating surface segment is parallel with said fourth grating surface segment and wherein said second grating surface segment is parallel with said third grating surface segment; and reflecting said chirped pulse with a reflector positioned on said optical axis after said fourth grating surface segment;
wherein the frequency content of a chirped pulse traveling on said optical axis will be dispersed by said first grating surface segment to produce a frequency dispersed pulse, wherein the frequency content of said frequency dispersed pulse will be amplified by said second grating surface segment to produce an amplified frequency dispersed pulse, wherein the amplified dispersal of the frequency content of said amplified frequency dispersed pulse will be reduced by said third grating segment, to produce a reduced frequency dispersed pulse, wherein said reduced frequency dispersed pulse will be collimated by said fourth grating surface segment to produce a collimated frequency dispersed pulse and wherein said collimated frequency dispersed pulse will be reflected back on said optical axis to produce a compressed frequency content pulse upon reflection from said first grating surface segment.

* * * * *